Oct. 19, 1965 F. C. ALPERS 3,213,451
AIRBORNE CONTOUR-SENSING RADAR
Filed March 29, 1963 2 Sheets-Sheet 1

FREDERICK C. ALPERS
INVENTOR.

BY
ATTORNEYS

Oct. 19, 1965  F. C. ALPERS  3,213,451
AIRBORNE CONTOUR-SENSING RADAR
Filed March 29, 1963  2 Sheets-Sheet 2

FREDERICK C. ALPERS
INVENTOR.

BY
ATTORNEYS

United States Patent Office 3,213,451
Patented Oct. 19, 1965

3,213,451
AIRBORNE CONTOUR-SENSING RADAR
Frederick C. Alpers, Riverside, Calif., assignor to the United States of America as represented by the Secretary of the Navy
Filed Mar. 29, 1963, Ser. No. 269,210
4 Claims. (Cl. 343—17.1)
(Granted under Title 35, U.S. Code (1952), sec. 266)

The invention herein described may be manufactured and used by or for the Government of the United States of America for governmental purposes without the payment of any royalties thereon or therefor.

This invention relates to an airborne system for the detailed observation of features on the surface of the earth from a moving aircraft, and more particularly to an active intelligence system utilizing electromagnetic energy to scrutinize a strip of terrain over which an airplane or missile is flown, revealing features of interest by sensing both differences in height and in reflectivity.

The system is intended to fill the need for an airborne device which may be used for all-weather navigation over rear battleground and enemy buildup areas, for revealing the presence and disposition of targets (including enemy vehicles and material), and for missile guidance purposes.

Airborne systems for ground observation generally comprise a sensing means responsive to differences in surface reflectivity. Among the better known methods for detecting such differences are those employing photographic or television means in the visible or infrared region of the electromagnetic spectrum or radar means in the microwave region. Included in the radar methods are systems comprising a means for indication of moving targets and other systems which utilize synthetic array or "radar telescope" techniques to provide high resolution examination of an area off to one side of the carrying aircraft or missile.

Previous methods are inadquate in several respects. Infrared and visible light systems are extremely limited in use over terrain obscured by low clouds or fog. Ordinary radar systems, sensitive to either reflectivity or height differences alone, do not readily discriminate between background features ("clutter") and military objects. Radar systems employing moving target indication are insensitive to motion in a direction orthogonal to the line of sight, which is the usual relationship in observation from the air, and offer no advantage in the detection of non-moving objects. Synthetic array systems provide information regarding objects off to one side of the carrying vehicle, but not on objects directly below or ahead.

Advantages of the present invention include its usefulness over terrain obscured by smoke or fog, its greater discrimination between background features and military objects, its indication of the presence of vehicles without requiring that they be moving in a particlar direction on the surface of the observed terrain, and in general the greater likelihood of target identification. A further advantage is that, if it is desired to transmit surveillance information to a remote point, the present invention allows considerable simplification of the communication means, particularly in regard to bandwidth requirements, in comparison with previous airborne radar systems.

An object of the present invention is to provide a method of ground scrutiny and contour sensing from the air to permit detection and identification of objects on the surface of the ground.

Another object of the invention is to provide an airborne contour sensing radar system which combines height discrimination with reflectivity discrimination for the purpose of target identification.

Other objects and many of the attendant advantages of this invention will become readily appreciated as the same becomes better understood by reference to the following detailed description when considered in connection with the accompanying drawings wherein.

Figures 1, 3:
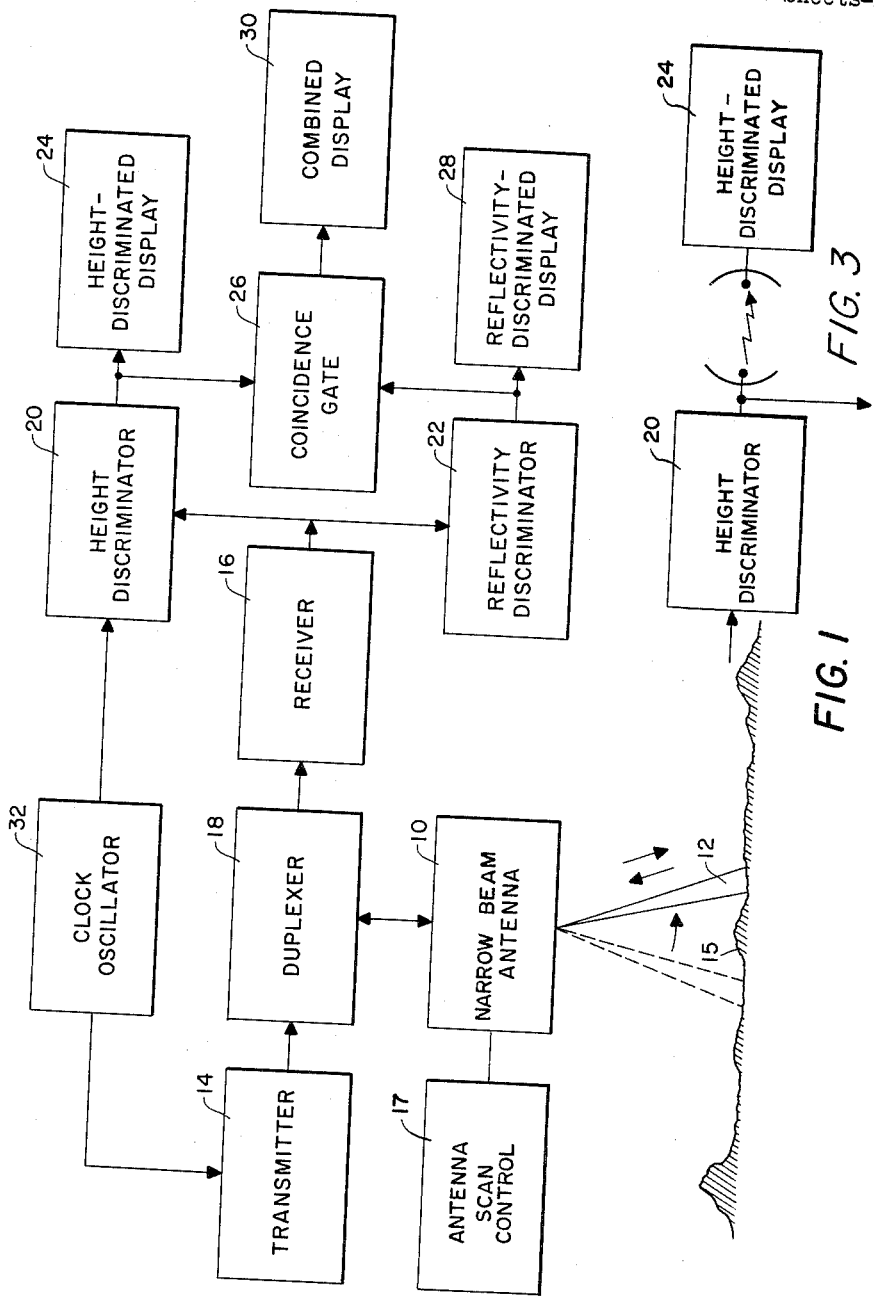
FIG. 1 is a block diagram of a preferred embodiment of the invention.
FIG. 3 is a partial block diagram showing a modification of FIG. 1.
Figure 2:
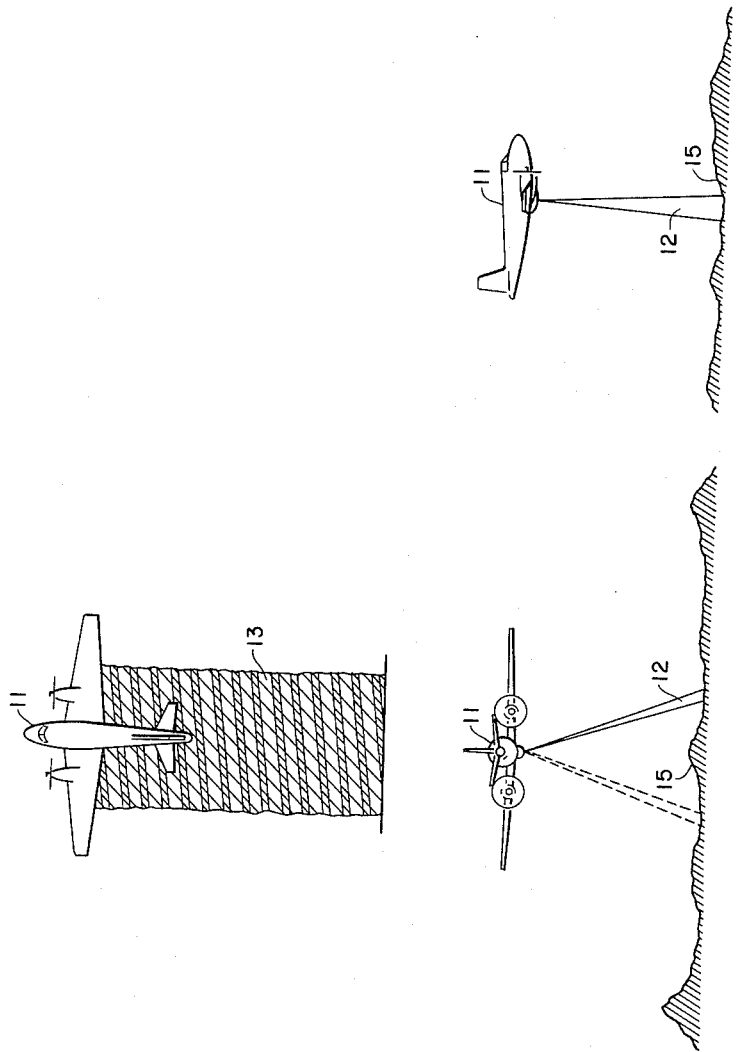
FIG. 2 is a pictorial diagram which indicates, by means of plan and elevation views, the terrain-scanning operation of the invention.

The preferred system is basically a high-resolution, short-range, very narrow pulsed radar system designed to operate at a wavelength of less than one centimeter. As may be seen from FIGURES 1 and 2, the system includes a scanning antenna 10 mounted on an aircraft 11 which produces a narrow scanning beam 12 that scans an area 13 of terrain 15. The output of a transmitter 14 and the input of a receiver 16 are connected through a duplexer 18 to the antenna 10. The output of receiver 16 is connected to both a height discriminator 20 and a reflectivity discriminator 22. The output of height discriminator 20 is connected directly or by data link, as shown in FIG. 3, to a height display 24 and to one input of a coincidence gate 26 both of which may be located at a remote station. The output of reflectivity discriminator 22 is connected directly or by data link to a reflectivity display 28 and to a second input of coincidence gate 26. The output of coincidence gate 26 is connected to a combined display 30. Combined display 30 and reflectivity display may also be located at the remote station. The output of clock oscillator 32 is connected to both transmitter 14 and height discriminator 20.

To illustrate the operation of the present invention, typical system parameters may be assumed. For the resolution of ground objects separated horizontally by distances as small as 20 feet and for the detection of differences in height of as little as 2 feet, when the system is carried in an aircraft or missile flying at an altitude of from 1,000 to 3,000 feet at a ground speed of about 500 knots, antenna 10 is arranged to produce a scanning beam 12 of angular width less than one degree in either plane of polarization. The desired beam width may be obtained at K-band frequencies by means of either a paraboloidal or flat plate array antenna two or three feet in diameter. By means of antenna scan control 17 which may be of any suitable electrical or mechanical scanning means, antenna 10 causes beam 12 to scan through an angular range from approximately 20 degrees to port of vertical to an equal angle to starboard of vertical in a period of approximately 1/40 second and to return in the reverse direction practically instantaneously, repeating such 40-degree scans approximately 40 times per second. Scanning in the direction of flight is accomplished automatically by the motion of the aircraft or missile itself. At the assumed vehicular speed, adequate coverage of terrain 15 by this method of scan would require a transmitted pulse repetition rate of 4,000 or more per second.

As is indicated in FIGURE 1, clock 32 which may be in the form of a stable oscillator is used to time the output from transmitter 14, in the form of, say, 0.01 microsecond pulses with a rise time of about 0.002 microsecond. The transmitter output is fed to antenna 10 through duplexer 18 which, except during the occurrence of a transmitter pulse, permits the reflected signals from the ground 15 to pass from antenna 10 to receiver 16. Signals detected by receiver 16 are then applied to the inputs of height discriminator 20 and reflectively discriminator 22.

Several types of height discriminating circuits 20 might be used to pick out vehicles or other objects which differ in elevation from the surrounding area of the ground, for example, the discriminator shown and described in copending application Serial No. 668,269 of Robert W. Bogle et al. for Echo Altimeter for A Low Level Guidance System, filed June 26, 1957, now Patent No. 3,088,112. Reflectively discriminator 22 may be of the type utilized in the conventional bombing radar system. Such circuits might detect either small differences in range from one pulse to the next or a difference from the average as determined by a tracking gate. Accurate synchronization for such range measurements is provided by the output of the clock circuit 32. Under some conditions it would be possible to detect a target by the broadening of the echo pulse width as a result of signal return from both raised objects and ground 34.

As FIGURE 1 indicates, the outputs of discriminators 20 and 22 are fed to display circuits 24 and 28 and through a coincidence circuit 26 to a combined display 30. The design and adjustment of discriminators 20 and 22 is such that only targets of probable interest will produce signal outputs to display circuits 24 and 28. In the preferred system, amplitude differences between successive output pulses are used to produce intensity modulation of the beams of cathode-ray oscilloscopes in the display circuits 24 and 28, so that direct visual presentations of terrain variations in height and reflectivity are obtained to within the resolution of the system. A more sophisticated display is provided by the circuits 26 and 30. Here coincidence gate 26 produces an output signal to the combined display 30 only when both height variations and reflectivity variations occur simultaneously.

Several possible alternate methods of construction will be apparent for the components of the system. In particular, scanning in the port/starboard direction may be accomplished by a direct mechanical arrangement such as a rolling action of a missile. The choice of transmitter frequency, antenna beamwidth, repetition rate, pulse width, and degree of leading edge discrimination are limited only by the state of the art and the intended use.

Obviously many modifications and variations of the present invention are possible in the light of the above teachings. It is therefore to be understood that within the scope of the appended claims the invention may be practiced otherwise than as specifically described.

What is claimed is:
1. An airborne contour sensing radar system for the detection and identification of objects on the surface of the ground comprising:
   (a) energy pulse generating means,
   (b) antenna means coupled to said energy pulse generating means for transmitting pulse energy in a beam of small solid angle and receiving echoes of said pulse energy,
   (c) scanning control means for sweeping said beam through a controllable arc of less than 180 degrees and returning said beam in the reverse direction instantaneously for continuing a unidirectional scan without delay upon completion of the last preceding scan,
   (d) detecting circuit means coupled to said antenna means for detecting the received pulse energy,
   (e) discrimination means coupled to said detector means for the analysis of height and reflectivity information from the received energy,
   (f) gating means coupled to said discrimination means for correlating the height and reflectivity information,
   (g) display means coupled to said gating means for the presentation of said information.

2. An airborne contour sensing radar system for the detection and identification of objects on the surface of the ground, the combination comprising:
   (a) energy pulse generating means,
   (b) antenna means coupled to said energy pulse generating means for transmitting pulse energy in a beam of small solid angle and receiving echos of said pulse energy,
   (c) scanning control means for sweeping said beam through a controllable arc of less than 180 degrees and returning said beam in the reverse direction instantaneously for continuing a unidirectional scan without delay upon completion of the last preceding scan,
   (d) detecting circuit means coupled to said antenna means for detecting the received pulse energy,
   (e) duplexing means coupled to said pulse generating means, said antenna means and to said detecting means for blocking said detecting means to energy reception during the transmission of energy pulses,
   (f) discrimination means coupled to said detector means for the analysis of height and reflectivity information from the received energy,
   (g) gating means coupled to said discrimination means for correlating the height and reflectivity information,
   (h) display means coupled to said gating means for the presentation of said information.

3. An airborne contour sensing radar system for the detection and identification of objects on the surface of the ground comprising:
   (a) energy pulse generating means,
   (b) timing means coupled to said energy pulse generating means to time the output pulses transmitted therefrom,
   (c) antenna means coupled to said energy pulse generating means for transmitting pulse energy in a beam of small solid angle and receiving echos of said pulse energy,
   (d) scanning control means for sweeping said beam through a controllable arc of less than 180 degrees and returning said beam in the reverse direction instantaneously for continuing a unidirectional scan without delay upon completion of the last preceding scan,
   (e) detecting circuit means coupled to said antenna means for detecting the received pulse energy,
   (f) discrimination means coupled to said detector means for the analysis of height and reflectivity information from the received energy.
   (g) gating means coupled to said discrimination means for correlating the height and reflectivity information,
   (h) display means couped to said gating means for the presentation of said information.

4. An airborne contour sensing radar system for the detection and identification of objects on the surface of the ground, the combination comprising:
   (a) energy pulse generating means,
   (b) antenna means coupled to said energy pulse generating means for transmitting pulse energy in a beam of small solid angle and receiving echos of said pulse energy,
   (c) scanning control means for sweeping said beam through a controllable arc of less than 180 degrees and returning said beam in the reverse direction instantaneously for continuing a unidirectional scan without delay upon completion of the last preceding scan,
   (d) detecting circuit means coupled to said antenna means for detecting the received pulse energy,
   (e) duplexing means coupled to said pulse generating means, said antenna means and to said detecting means for blocking said detecting means to energy reception during the transmission of energy pulses,
   (f) height discriminator means coupled to said detecting circuit means,
   (g) clock oscillator means coupled to said energy pulse generating means and to said height discriminator means, (h) reflectivity discriminator means coupled to said detecting circuit means,
(i) coincidence gate circuit means coupled to said height and reflectivity discriminator circuits for producing output signals representing ground targets,
(j) display circuit means coupled to said coincidence gate circuit means for visually displaying said output signals.

References Cited by the Examiner

UNITED STATES PATENTS

| | | | | |
|---|---|---|---|---|
| 2,705,319 | 3/55 | Dauber | | 343—5 |
| 2,773,253 | 12/56 | Sunstein | | 343—17.1 |
| 2,795,780 | 6/57 | Gross et al. | | 343—6 |
| 2,822,536 | 2/58 | Sandretto | | 343—5 |
| 2,842,759 | 7/58 | Kenyon | | 343—6 |
| 3,001,187 | 9/61 | Hammond et al. | | |
| 3,007,155 | 10/61 | Petrides et al. | | 343—5 |
| 3,023,407 | 2/62 | Basim et al. | | 343—5 |
| 3,093,823 | 6/63 | Reed. | | |
| 3,097,355 | 7/63 | Hobrough et al. | | 343—7.3 |
| 3,110,897 | 11/63 | Laurent | | 343—17.1 |
| 3,146,442 | 8/64 | Hansford et al. | | |

CHESTER L. JUSTUS, *Primary Examiner.*

KATHLEEN CLAFFY, *Examiner.*